United States Patent
Cruickshanks et al.

(10) Patent No.: US 10,482,366 B2
(45) Date of Patent: Nov. 19, 2019

(54) MITIGATING ADJACENT RFID READER INTERFERENCE

(71) Applicant: Neology, Inc., San Diego, CA (US)

(72) Inventors: George D. Cruickshanks, Raleigh, NC (US); David R. Missimer, Raleigh, NC (US); Christopher J. Hopkins, Innisfil, CA (US); Steven C. Lin, Chapel Hill, NC (US); Thomas J. Frederick, Chapel Hill, NC (US)

(73) Assignee: Neology, Inc., San Diego, CA (US)

( * ) Notice: Subject to any disclaimer, the term of this patent is extended or adjusted under 35 U.S.C. 154(b) by 0 days.

(21) Appl. No.: 16/356,605

(22) Filed: Mar. 18, 2019

(65) Prior Publication Data

US 2019/0213457 A1 Jul. 11, 2019

Related U.S. Application Data (63) Continuation of application No. 15/816,532, filed on Nov. 17, 2017, now Pat. No. 10,235,616, which is a
(Continued)

(51) Int. Cl.
*G06K 19/07* (2006.01)
*G06K 7/10* (2006.01)
*H04B 5/00* (2006.01)

(52) U.S. Cl.
CPC ..... *G06K 19/0724* (2013.01); *G06K 7/10356* (2013.01); *H04B 5/0062* (2013.01)

(58) Field of Classification Search
CPC ......... G06K 19/0724; G06K 19/07749; G06K 7/10356; G06K 7/10316; G08G 1/0175;
(Continued)

(56) References Cited

U.S. PATENT DOCUMENTS

| | | | |
|---|---|---|---|
| 7,411,921 B2 * | 8/2008 | Strong | G01S 5/02 340/10.1 |
| 7,518,532 B2 | 4/2009 | Tiernay | |
| 7,772,977 B2 | 8/2010 | Tiernay | |
| 8,242,890 B2 | 8/2012 | Gravelle | |
| 8,314,687 B2 | 11/2012 | Gravelle | |
| 8,427,279 B2 | 4/2013 | Gravelle | |
| 9,390,303 B2 | 7/2016 | Sandler | |

(Continued)

FOREIGN PATENT DOCUMENTS

CN 102298684 A 12/2011

OTHER PUBLICATIONS

International Search Report for PCT International Application No. PCT/US2014/069497 dated Mar. 12, 2015, 4 pages.

*Primary Examiner* — Hung T Nguyen
(74) *Attorney, Agent, or Firm* — Procopio, Cory, Hargreaves & Savitch LLP; Mark W. Catanese (57) ABSTRACT

A radio frequency identification (RFID) automatic vehicle identification (AVI) system configured to mitigate signal interference, the system comprising a plurality of RFID readers, comprising a first RFID reader and a second RFID reader; and a plurality of antennas, wherein a first antenna is connected to the first RFID reader and a second antenna is connected to the second RFID reader. Prior to the first RFID reader transmitting a signal through the first antenna, the first RFID reader samples a received radio frequency (RF) signal from the first antenna, and if the received RF signal meets predetermined strength and frequency criteria, the first RFID reader inhibits transmission of the signal through the first antenna.

20 Claims, 3 Drawing Sheets

Related U.S. Application Data continuation of application No. 15/102,905, filed as application No. PCT/US2014/069497 on Dec. 10, 2014, now Pat. No. 9,824,309.

(60) Provisional application No. 61/935,394, filed on Feb. 4, 2014, provisional application No. 61/915,674, filed on Dec. 13, 2013.

(58) Field of Classification Search
CPC ...... G07B 15/00; G07B 15/06; G07B 15/063; H04B 5/0062
USPC ... 340/572.1, 572.4, 572.7, 10.1, 10.34, 941
See application file for complete search history.

(56) References Cited

U.S. PATENT DOCUMENTS

| | | |
|---|---|---|
| 2002/0063622 A1 | 5/2002 | Armstrong |
| 2006/0076401 A1 | 4/2006 | Frerking |
| 2007/0139163 A1 | 6/2007 | Powell |
| 2008/0079577 A1 | 4/2008 | Malik |
| 2008/0180220 A1 | 7/2008 | Hollister |
| 2010/0289623 A1 | 11/2010 | Roesner |
| 2011/0279239 A1 | 11/2011 | Gravelle |
| 2011/0279240 A1 | 11/2011 | Gravelle |
| 2012/0032788 A1 | 2/2012 | Gravelle |
| 2012/0280796 A1 | 11/2012 | Gravelle |
| 2013/0119132 A1 | 5/2013 | Tiernay |
| 2014/0218175 A1 | 8/2014 | Melville |
| 2016/0307087 A1* | 10/2016 | Cruickshanks .... G06K 7/10356 |

* cited by examiner

MITIGATING ADJACENT RFID READER INTERFERENCE

CROSS REFERENCE TO RELATED APPLICATIONS

This application is a Continuation of U.S. application Ser. No. 15/816,532 filed Nov. 17, 2017, now U.S. Pat. No. 10,235,616 issued on Mar. 19, 2019, which in turn is a Continuation of U.S. application Ser. No. 15/102,905 filed Jun. 9, 2016, now U.S. Pat. No. 9,824,309 issued on Nov. 21, 2017, which is a national stage filing under 35 U.S.C. 371 of PCT/US2014/069497 filed Dec. 10, 2014, which claims the benefit of U.S. Provisional Application No. 61/915,674 filed Dec. 13, 2013, and U.S. Provisional Application No. 61/935,394 filed Feb. 4, 2014, the disclosures of which are incorporated by reference in their entirety herein.

TECHNICAL FIELD

The present application relates to the field of radio frequency transceivers and mitigating interference. Specifically, the present application relates to inhibiting transmission of signals by a radio frequency identification (RFID) transceiver or RFID reader to mitigate interference of adjacent transceivers in the context of automatic vehicle identification (AVI) tolling.

BACKGROUND

Radio frequency (RF) and RFID readers are used in a variety of contexts to detect the presence of items with RFID tags or transponders attached to the items. Examples include tracking assets in a warehouse and detecting the presence of vehicles driving down a road for the purposes of toll collection. In many instances, multiple RFID readers are used to be able to detect the presence of these items in a larger physical area. However, antennas from the multiple readers can generate overlapping fields when transmitting an interrogation signal, thereby creating interference between the multiple readers.

A variety of approaches have been taken to address the issue of signal interference. U.S. Pat. No. 7,772,977 to Tiemay describes an approach of using frequency-selective filters in RFID tag to remove interference terms in a signal. United States Patent Publication No. 2012/0280796 to Gravelle et al. describes interleaving time slots for antenna transmission in a configuration where a single antenna is attached to each RFID reader, and each RFID reader is assigned to transmit in a time slot during which no RFID readers adjacent to it are transmitting. U.S. Pat. No. 8,314,687 to Gravelle et al. describes using time division multiplexing to synchronize communication of multiple RFID readers using multiple protocols. None of these approaches allows RFID readers to operate in a free-running mode, as opposed to a time division multiplexing mode, without requiring modifications to RFID tags, which implementation can be costly when implemented on a wide scale.

SUMMARY

Adjacent antennas from two different readers may cause potential interference leading to multiple problems in the ability for RFID readers to read passing tags, as in an open-road tolling environment. The potential for interference can be made worse depending on the communication protocol being transmitted, e.g. certain protocols have worse spectral occupancy than others. Interference between adjacent antennas can confuse the tag so that it is unable to decipher a signal transmitted by a RFID reader and therefore does not respond. Or the tag may respond but the interference may be too strong to allow the RFID reader to demodulate the tag response. Or, depending on the protocol, a tag may be placed into a different state after already having been placed into the appropriate state when it receives a different command from the adjacent RFID reader. These factors and others are further exacerbated in terms of an RFID reader's ability to read the tag when the tag is in the interrogation zone for a very short period of time, as is the case in high speed vehicle open road tolling applications where tags are often in the RF field in the range of about 100-500 milliseconds.

The present invention provides solutions for the problems discussed above and provides several advantages over prior solutions to interference between multiple RFID readers. For example, the present invention allows RFID readers to operate in a free-running mode without the interference that frequently occurs with such reader operation. This provides a higher level of efficiency when compared with a time-division or other synchronization scheme between RFID readers. Additionally, in some embodiments the present invention provides for synchronization between RFID readers without any requirement for adjacent RFID readers to be physically attached to each other, reducing complexities associated with physical connection in large RFID reader installations and applications.

The present invention provides in one instance a radio frequency identification (RFID) automatic vehicle identification (AVI) system configured to mitigate signal interference. The system comprises a plurality of RFID readers, including a first RFID reader and a second RFID reader; and a plurality of antennas, wherein a first antenna is connected to the first RFID reader and a second antenna is connected to the second RFID reader. Prior to the first RFID reader transmitting a signal through the first antenna, the first RFID reader samples a received radio frequency (RF) signal from the first antenna, and if the received RF signal meets predetermined strength and frequency criteria, the first RFID reader inhibits transmission of the signal through the first antenna.

In another aspect, the present invention includes a radio frequency identification (RFID) automatic vehicle identification (AVI) system configured to mitigate signal interference. The system includes a plurality of RFID readers, wherein a first RFID reader is connected to a second adjacent RFID through a digital input/output (I/O) line. The system also includes a plurality of antennas, wherein a first antenna is connected to the first RFID reader and a second antenna is connected to the second RFID reader, and wherein the first antenna is adjacent to the second antenna. Prior to the first RFID reader transmitting a signal through the first antenna, the first RFID reader reads the digital I/O port from the second RFID reader, and if the signal on the I/O port indicates the second antenna is active, the first RFID reader inhibits transmission of the signal through the first antenna.

In yet another aspect, the present invention includes a method of mitigating signal interference in a radio frequency identification (RFID) automatic vehicle identification (AVI) system. The method includes providing a plurality of RFID readers, including a first RFID reader and a second RFID reader; and providing a plurality of antennas, wherein a first antenna is connected to the first RFID reader and a second antenna is connected to a second RFID reader. The method further includes sampling, with the first RFID reader, a received radio frequency signal through the first antenna. If the received RF signal meets predetermined strength and frequency criteria, inhibiting, with the first RFID reader, transmission of the signal through the first antenna.

In another aspect, the present invention includes a method of mitigating signal interference in a radio frequency identification (RFID) automatic vehicle identification (AVI) system. The method includes providing a plurality of RFID readers wherein a first RFID reader is connected to a second adjacent RFID through a digital input/output (I/O) line; and providing a plurality of antennas, wherein a first antenna is connected to a first RFID reader and a second antenna is connected to a second RFID reader. Prior to the first RFID reader transmitting a signal through the first antenna, reading, with the first RFID reader, the digital I/O port from the second RFID reader. If the signal is active for the adjacent reader, the first RFID reader inhibiting transmission of the signal through the first antenna.

BRIEF DESCRIPTION OF DRAWINGS

The following figures provide illustrations of the present invention. They are intended to further describe and clarify the invention, but not to limit scope of the invention.

Like numbers are generally used to refer to like components. The drawings are not to scale and are for illustrative purposes only.

DETAILED DESCRIPTION

Figure 1:
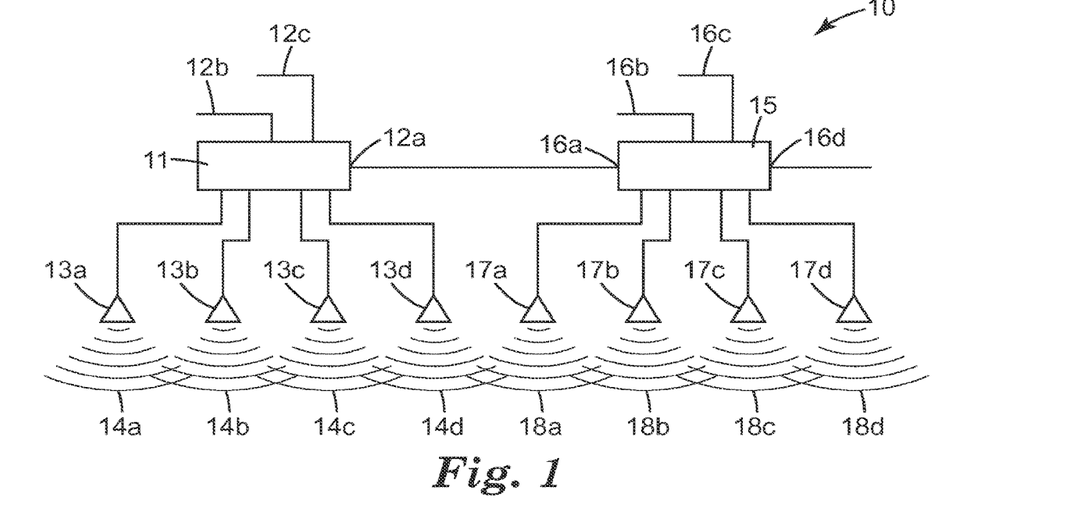
FIG. 1 is a diagram of two RFID readers showing interfering signals transmitted by antennas.

FIG. 1 is a diagram of two RFID readers showing interfering signals transmitted by antennas. RFID reader system 10 includes RFID reader 11 and RFID reader 15. Where the term RFID reader is used throughout this disclosure, it can be used to refer to an RFID transmitter, or an RFID transceiver. RFID readers 11, 15 typically function by transmitting radio frequency interrogation signals 14a-d, 18a-d through antennas 13a-d, 17a-d. If an RFID tag or transponder is in the field of the interrogation signals 14a-d, 18a-d, it responds to the RFID readers 11, 15. The type of response generated by the RFID tag or transponder is dependent upon the tag design. As would be understood by one of skill in the art, two common types of RFID tags are passive or semi-passive tags and active tags. A passive or semi-passive RFID tag typically does not include an independent power source. Instead, when a passive RFID tag is activated by an interrogation signal 14a-d, 18a-d generated by an RFID reader 11, 15, the passive RFID tag will backscatter or reflect the received signal with data from an integrated circuit (IC) or die modulated into the backscattered signal. An active RFID tag typically includes an independent power source. Because of this, an active RFID tag can independently generate a signal to initiate communication with an RFID reader 11, 15, or may independently generate a signal to respond to queries or communications from an RFID reader 11, 15. An individual of ordinary skill in the art, upon reading the present disclosure, will recognize that a variety of radio frequency (RF) readers or transceivers could be used in the place of the RFID readers 11, 15 shown in FIG. 1 and are intended to be within the scope of the present invention.

RFID readers 11, 15 each have a power port 12c, 16c, a data port 12b, 16b, and digital input/output (I/O) ports 12a, 16a, 16d. Power ports 12c, 16c can be connected to any appropriate power source to provide power to the RFID readers 11, 15 and connected antennas 13a-d, 17a-d. Data ports 12b, 16b may be connected to a computer or some other device that controls what signals are transmitted via which antennas 13a-13d, 17a-17d connected to RFID readers 11, 15.

RFID readers 11, 15 each have a number of antenna ports to which antennas 13a-13d, 17a-17d are connected. RFID readers 11, 15 may have any desired number of antenna ports, for example, one port, two ports, four ports, or any other number of ports. RFID readers have a variety of configurations. Some RFID readers have a single antenna integrated into the RFID reader unit or a single external antenna. Other RFID readers in the industry have four antenna ports, as shown in FIG. 1. Antennas 13a-d, 17a-d connected to the antenna ports are configured to transmit signals in a designated area to detect the presence of RFID transponders located in that area. As discussed further with respect to FIG. 2, one common example of antennas 13a-d, 17a-d being configured to transmit signals in a particular area is a number of RFID readers 11, 15 and antennas 13a-d, 17a-d being disposed over multiple lanes of traffic for roadway tolling.

Antennas 13a-d, 17a-d may all be configured to transmit similar signals using the same communication protocol, or may be configured to cycle through different protocols. Examples of protocols that antennas 13a-d, 17a-d may be configured to transmit include ISO 18000-63, ISO 18000-62, Transcore Sego™, Kapsch TDM (EZ-PASS), Caltrans Title-21, ASTMv6 and ISO 10374. Further, a variety of types of antennas may be used. Examples of types of antennas include linear polarized antennas or circular polarized antennas, such as Patch and Yagi type antennas, and other types of antennas, as will be apparent to an individual of skill in the art upon reading the present disclosure.

As shown in FIG. 1, fields 14a-d, 18a-d, generated by antennas 13a-d, 17a-d often overlap to ensure complete coverage of a particular area. However, this overlap creates signal interference such that if two antennas with overlapping fields are transmitting at the same time, the signal received by a tag or transponder may have such high levels of interference that the tag or transponder is not able to demodulate and respond to or backscatter the received signal. A single RFID reader 11 or 15 is typically configured so that it prevents such interference between antennas attached to that reader. For example, when RFID reader 11 is operating in free-running mode, the RFID reader will transmit a signal through a particular antenna, such as antenna 13a, and look for a response from a tag or transponder. If no response is found, the RFID reader will then transmit a signal through the next antenna in the sequence, which in this instance may be antenna 13b. If no tag or transponder is found, the RFID reader will continue to transmit the signal through each consecutive antenna in the sequence until all antennas have been tried. The sequence would then start over. This process is referred to as "free-running mode" because neither synchronized time-division nor another similar multiplexing scheme is involved. However, using a free-running mode in RFID reader 11 does not compensate for potential interference between adjacent antennas, such as antenna 13d connected to RFID reader 11 and antenna 17a connected to RFID reader 15. Adjacent, as used throughout this disclosure, refers to two items, where one immediately precedes or follows the other.

In the present invention, various methods can be used to mitigate interference between adjacent antennas from different RFID readers.

Figure 2:
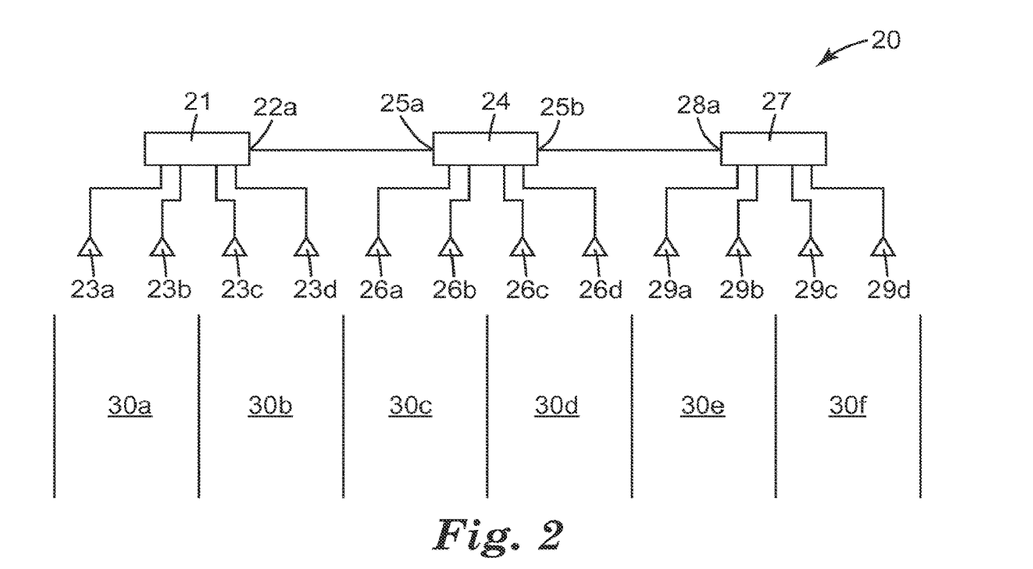
FIG. 2 is a diagram of an electrically connected system of three RFID readers disposed over a six-lane roadway.

FIG. 2 is a diagram of an electrically connected system 20 of three RFID readers 21, 24, 27 disposed over a six-lane roadway 30a-30f. Like the RFID readers in FIG. 1, RFID readers 21, 24, 27 have I/O ports 22a, 25a, 25b, 28a connecting adjacent RFID readers. In this instance, RFID reader 21 is adjacent to RFID reader 24, and therefore these two RFID readers 21, 24 are connected to each other through their I/O ports 22a, 25a. Similarly, RFID reader 24 is adjacent to RFID reader 27 and RFID readers 24, 27 are connected to each other through I/O ports 25b, 28a.

FIG. 2 shows multiple antennas 23a-d, 26a-d, 29a-d connected to RFID readers 21, 24, 27; however, any number of antennas may be connected to RFID readers 21, 24, 27 consistent with the present invention. The use of twelve antennas 23a-d, 26a-d, 29a-d across a six-lane road 30a-f provides for improved coverage for vehicles changing lanes, and also provides data for lane discrimination algorithms. In this particular configuration, antenna 23d is adjacent to antenna 26a, and antenna 26d is adjacent to antenna 29a. Each of these antenna adjacencies provides the potential for interference between antennas for different readers.

To mitigate interference between adjacent antennas connected to different RFID readers, before RFID reader 21 transmits a signal through antenna 23d, it reads the digital I/O port from adjacent RFID reader 24. If the signal on the line connected to the I/O port 25a is active, indicating that RFID reader 24 is transmitting a signal over antenna 26a, RFID reader 21 inhibits transmission of a signal through antenna 23d while line connected to I/O port 22a is active.

To ensure necessary communication between RFID reader 21 and RFID reader 24, RFID reader 24 is programmed to only set I/O port 25a to an active state when RFID reader 24 is transmitting a signal over antenna 26a. Likewise, RFID reader 21 is configured to set the I/O port 22a to an active state when transmitting a signal over antenna 23d. RFID reader 24 also sets I/O port 25b to an active state when transmitting a signal through antenna 26d, and RFID reader 27 sets I/O port 28a to an active state when transmitting a signal through antenna 29a. In another configuration, lines connected to I/O ports may be set to a non-active or low state to indicate that the associated antenna is currently transmitting a signal. Further, when an RFID reader ceases to transmit a signal over the antenna adjacent to an antenna from another RFID reader, it sets the I/O port to the appropriate state to indicate that the reader is not transmitting. In the configuration discussed with respect to FIG. 2, the RFID reader would set the I/O port to a low or non-active state to indicate that the RFID reader is not transmitting over the antenna associated with the particular I/O port.

If, as RFID reader 21 prepares to transmit a signal over antenna 23d, it determines that adjacent antenna 26a is transmitting a signal by detecting that the line connected to I/O port 25a is high, RFID reader 21 then skips antenna 23d in the programmed antenna sequence for RFID reader 21, and instead transmits a signal over the next antenna, which may be antenna 23a, or may be any antenna programmed to follow antenna 23d in sequence.

In some configurations, the bypassed antenna, or antenna 23d in this instance, may be placed in a transmission queue. When a bypassed antenna 23d is placed in a transmission queue, RFID reader 21 will transmit on the next antenna in the mux sequence, and then immediately again try the antenna from the queue, in this case, antenna 23d. If the signal on the line connected to I/O port 22a indicates that RFID reader 24 is no longer transmitting a signal over adjacent antenna 26a, RFID reader 21 then transmits over antenna 23d before continuing on with the normal antenna sequence. This concept of a transmission queue allows for an RFID reader to transmit over each antenna for a nearly equal period of time, providing consistent coverage across the area covered by the antennas attached to the RFID reader.

In another instance, where RFID reader 24 is preparing to transmit a signal over antenna 26d, RFID reader 24 reads the line connected to I/O port 28a. If RFID reader 24 discovers that I/O port 28a indicates that antenna 29a is currently transmitting a signal, RFID reader 24 then moves to the next antenna in sequence. For the purposes of illustration, the next antenna in sequence may be antenna 26a. Prior to transmitting a signal over antenna 26a, RFID reader reads I/O port 22a associated with RFID reader 21 to determine whether or not RFID reader 21 is currently transmitting a signal over antenna 23d. If I/O port 22a is active, indicating that RFID reader 21 is transmitting a signal through antenna 23d, RFID reader 24 then moves to the next antenna in sequence, antenna 26b. Because all antennas adjacent to antenna 26b are controlled by RFID reader 24, RFID reader 24 transmits a signal through antenna 26b because it knows that no adjacent antennas 26a, 26c are currently transmitting a signal. As discussed above with respect to RFID reader 21, in another configuration, if RFID reader 24 discovers that I/O port 25b indicates that antenna 29a is currently transmitting a signal, RFID reader 24 may place antenna 26d in a transmission queue so that RFID reader 24 transmits over antenna 26d when it detects that RFID reader 27 is no longer transmitting over antenna 29a.

When transmitting a signal over an antenna, the RFID reader may transmit a variety of communication protocols, including ISO 18000-63, ISO 18000-62, Transcore Sego™, Kapsch TDM (EZ-PASS™), Caltrans Title-21, ASTMv6 and ISO 10374.

Figure 3:
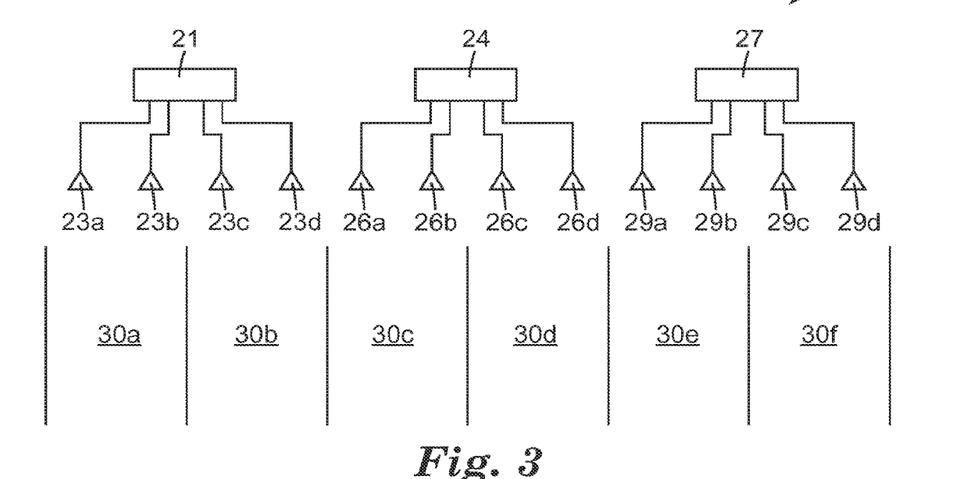
FIG. 3 is a diagram of an electrically independent system of three RFID readers disposed over a six-lane roadway.

FIG. 3 is a diagram of an electrically independent system 20 of three RFID readers disposed over a six-lane roadway. The physical configuration of RFID readers 21, 24, 27 is similar to that shown in FIG. 2. Each RFID reader 21, 24, 27 is connected to four antennas 23a-d, 26a-d, 29a-d disposed over a six lane road 30a-f. However, in this particular configuration, adjacent RFID readers 21 and 24 and adjacent RFID readers 24 and 27 are not connected to each other through their respective I/O ports. In the configuration shown in FIG. 3, prior to an RFID reader 21 transmitting a signal through an antenna 23d, the RFID reader 21 samples a received radio frequency signal from antenna 23d, and if the received RF signal meets predetermined strength and frequency criteria, RFID reader 21 inhibits transmission of a signal through antenna 23d.

While a sampled signal that meets predetermined strength and frequency criteria may be most likely to originate from an adjacent antenna 26a in the adjacent RFID reader 24, it may also originate from other RF sources generating signals in the area. Detection of an interfering signal prior to transmitting a signal through an affected antenna 23d allows RFID reader 21 not to waste time in its signal transmission sequence by transmitting a signal that will be compromised due to interference from other RF signals.

A variety of criteria may be used for the strength and frequency criteria. For example, for the detected signal to meet the strength criteria, the strength of the signal may be required to be greater than −40 dBm, −50 dBm, −60 dBm, −80 dBm, −100 dBm, or any number above, below or in between. The threshold for the strength criteria may be set during installation of an RFID reader as an installer is likely to test to determine what strength of signal will interfere with a signal transmitted by an antenna, given the particular installation variables. The frequency criteria may be related to any range in the MHz or high frequency, or GHz or ultra high frequency domains. For example, in one embodiment the RFID readers 21, 24, 27 may be configured to transmit protocols in the 902-928 MHz frequency bands. An associated frequency criteria may require that the detected signal frequency fall in the range of 850 MHz to 950 GHz. Alternative frequency ranges may be in the 860-870 MHz range; 2.3-2.5 GHz; and 5.7-6.0 GHz.

Additional criteria may be used to determine whether or not to inhibit transmission of a signal through a particular antenna. For example, other criteria include signal signature, such as signal bandwidth or signal modulation scheme. Examples of signal modulation criteria are: Large Carrier Amplitude Modulation with Manchester Encoding, and Suppressed Carrier Amplitude Modulation with PIE Encoding and other types of modulation as will be apparent to an individual of skill in the art upon reading the present disclosure. Signal bandwidth criteria may be correlated with the particular modulation scheme and transmission rate.

As described with respect to FIG. 2, RFID readers 21, 24, 27 may cycle through a variety of communication protocols while transmitting signals over a single or multiple antennas 23a-d, 26a-d, 29a-d.

Figure 4:
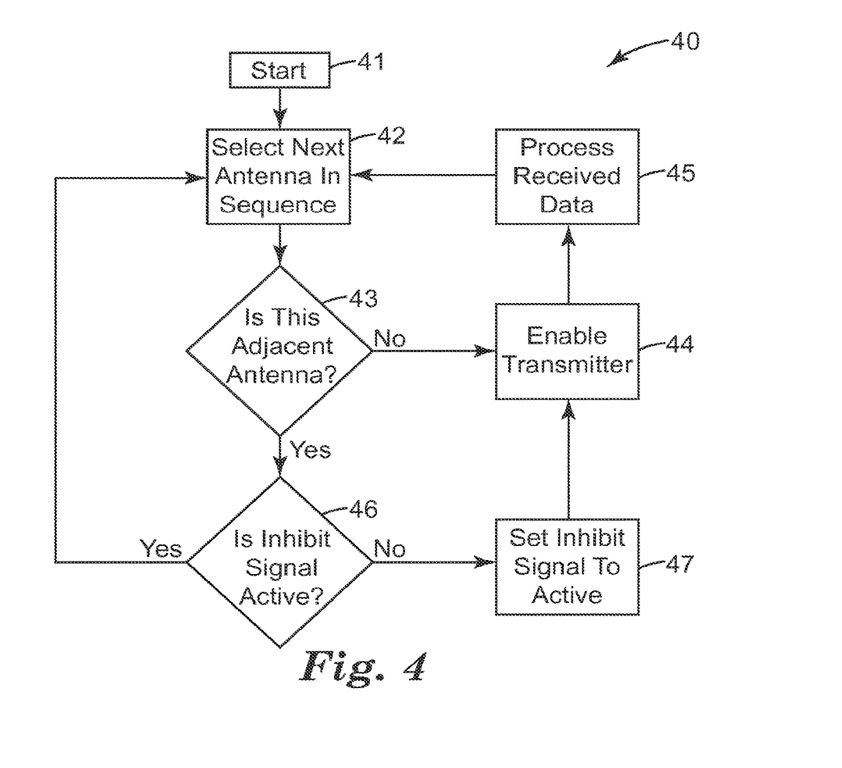
FIG. 4 is a flow chart illustrating a method of mitigating interference of adjacent antennas where adjacent RFID readers are connected to each other.

FIG. 4 is a flow chart illustrating a method of mitigating interference of adjacent antennas where adjacent RFID readers are connected to each other. An example of such a configuration is shown in FIG. 2. Step 41, Start, indicates an RFID reader decision to begin transmission. In Step 42, the RFID reader selects the appropriate antenna to transmit signals through. If the selected antenna is not an adjacent antenna as indicated in Step 43, the RFID reader enables the transmitter (Step 44), processes the data received from the queried RFID tag or transponder (Step 45) and continues on to select the next antenna in the sequence (Step 42). Once again, in Step 43, the RFID reader checks whether this is an adjacent antenna. In the case that it is an adjacent antenna, the RFID reader checks to see if the digital I/O port associated with the adjacent antenna connected to the adjacent reader is active in Step 46. If it is active, the transmitting RFID reader then selects the next antenna in sequence per Step 42. If the inhibit signal is not active, the RFID reader sets its own I/O port to an active state to indicate that it is currently transmitting over an adjacent antenna. The RFID reader then enables the transmitter (Step 44), processes the received data (Step 45) and selects the next antenna in sequence to begin transmission (Step 42). In an alternate configuration, the RFID reader may place the bypassed or skipped antenna in a transmission queue, and after transmitting on the next antenna in the mux sequence, the RFID reader checks to see if the digital I/O port indicates that the antenna adjacent to the antenna in the queue is active. If the adjacent antenna is not active, the RFID reader then transmits a signal over the antenna in the transmission queue before resuming the regular sequence of antennas.

Figure 5:
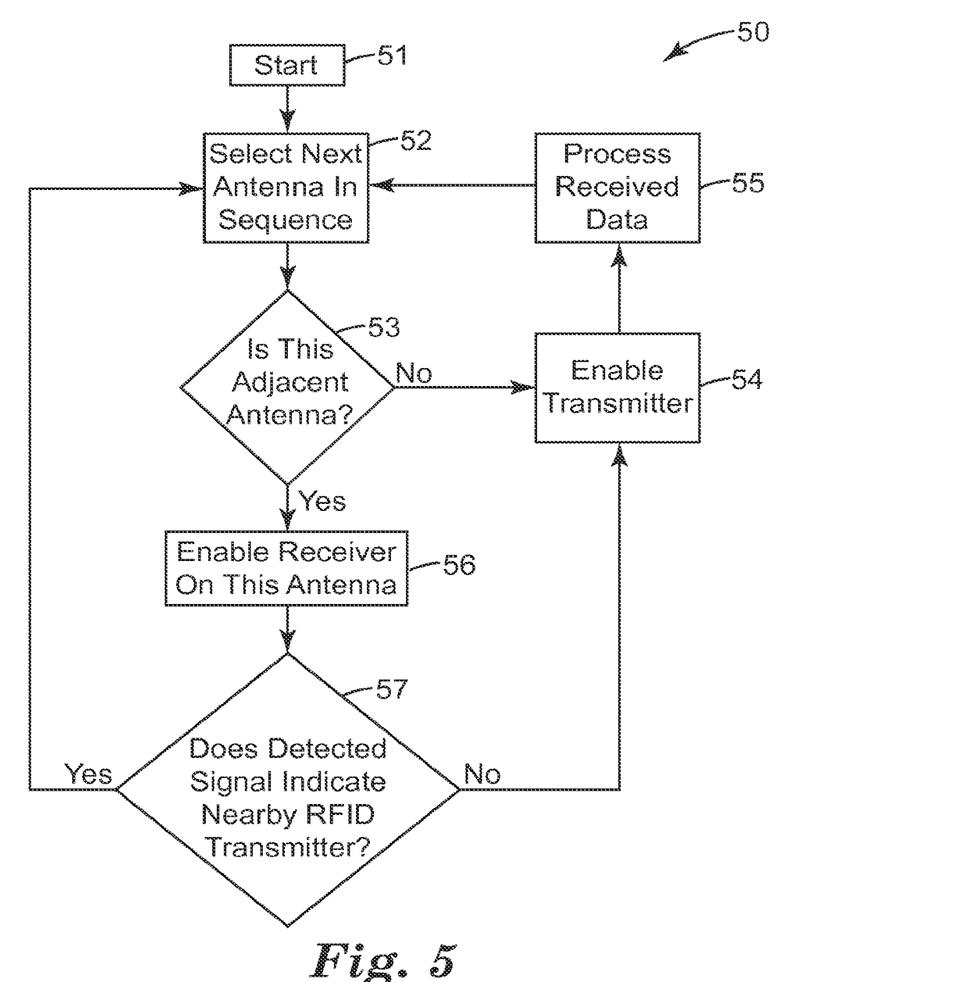
FIG. 5 is a flow chart illustrating a method of mitigating interference of adjacent antennas where adjacent RFID readers are not connected to each other.

FIG. 5 is a flow chart 50 illustrating a method of mitigating interference of adjacent antennas where adjacent RFID readers are not connected to each other. An example of such a configuration is shown in FIG. 3. Step 51, Start, indicates an RFID reader decision to begin transmission. In Step 52, the RFID reader selects the appropriate antenna to transmit signals through. If the selected antenna is not an adjacent antenna as indicated in Step 53, the RFID reader enables the transmitter (Step 54), processes the data received from the queried RFID tag or transponder (Step 55) and continues on to select the next antenna in the sequence (Step 52). Once again, in Step 53, the RFID reader checks whether this is an adjacent antenna. In the case that it is an adjacent antenna, the RFID reader enables the receiver on the antenna over which the RFID reader is about to transmit, as shown in Step 56. If the RFID reader detects a signal on the adjacent antenna that indicates that a nearby RFID transmitter is transmitting as shown in Step 57, the RFID reader selects the next antenna in sequence as shown in Step 52. If no signal is detected that is indicative of a nearby RFID transmitter, the RFID reader enables the transmitter (Step 54), processes the received data (Step 55) and selects the next antenna in sequence to begin transmission (Step 52).

EXAMPLES

Test Methods

Read Count:

Each tag was read for a total time of 30 seconds, and the number of cumulative reads is shown in Table 1, below.

Combined Effective Read Rate:

Combined Effective Read Rate was measured via the 3M Reader Test Tool via the "Cumulative Rate" metric. This tool produces measurements based on tag reads during a fixed time period, with both the total number of reads and the effective read rate over that time period being displayed. The effective read rate is calculated by dividing the total number of reads accumulated during the time period by the duration of the time period. Results are reported in Table 1, below.

Comparative Example

A radio frequency (RF) identification system was prepared. A first and second antennas were obtained from 3M Company, Austin, Tex., and each antenna was electrically connected via coaxial cables to each of two 3M 6204 RFID readers (obtained from 3M Company, Austin Tex.) (RFID reader 1 and RFID reader 2). The antennas were positioned to mimic the positioning typical when two antennas serviced by two different RFID readers are adjacent to each other over a tolling lane. Two tags were also provided. Tag 1 utilized the ISO 18000-6C protocol ("Windshield Mount Paper Sticker Tag", obtained from 3M Company), and tag 2 utilized the Transcore SeGo™ protocol, (supplied by the North Carolina Toll Authority). The tags were placed equally distant to and between the two antennas, and were separated by 12 inches (30.48 cm). The readers were configured to execute three protocols: ISO 18000-6C referred to as ISOC in the reader configuration setting, SeGo™ referred to as ISOB_80K in the reader configuration setting, and EZ-PASS referred to as PS111 in the reader configuration. In addition, the readers were configured to utilize two antenna ports (port 1 and port 2), with antenna port 2 having a 50 ohm terminator to inhibit all transmissions and receptions from that reader antenna port. The transmit power was set to Fcc Part90 levels, 33 dBm.

Tag 1 and Tag 2 were then read by the readers using a standard free-running mode, wherein each reader independently cycled between the configured antennas, and between the configured protocols on each antenna. The timing of the antenna sequencing was asynchronous between the two readers. Activation of the two adjacent antennae in an overlapping time slot occurred on a random basis with some statistical probability of occurrence.

Example

A radio frequency identification system configured to mitigate signal interference was prepared as described in the Comparative Example, except that the RFID readers were connected using a digital input/output (I/O) line and programmed so that prior to transmitting through the first antenna, a RFID reader 1 read the line connected to the digital I/O port and looked for an active signal, indicating that the second antenna was already being used. In such instances, the RFID reader 1 then inhibited transmission of the signal through the first antenna. This mode is subsequently referred to as "inhibit mode".

TABLE 1

| Examples | Total Read Count (Protocol-specific Effective Read Rate (per second)) | | Combined Effective Read Rate (reads per second, combined from both protocols) |
|---|---|---|---|
| | Tag 1 | Tag 2 | |
| EXAMPLE | | | |
| Reader 1 | 1278 (42) | 741 (24) | 66 |
| Reader2 | 1352 (45) | 726 (24) | 69 |
| Reader 1 | 1319 (43) | 737 (24) | 67 |
| Reader 2 | 1382 (46) | 767 (25) | 71 |
| Reader 1 | 1267 (42) | 738 (24) | 66 |
| Reader 2 | 1345 (44) | 727 (24) | 68 |
| COMPARATIVE EXAMPLE | | | |
| Reader 1 | 852 (28) | 374 (12) | 40 |
| Reader 2 | 995 (33) | 364 (12) | 45 |
| Reader 1 | 751 (25) | 388 (12) | 37 |
| Reader 2 | 1159 (38) | 398 (13) | 51 |
| Reader 1 | 830 (27) | 409 (13) | 40 |
| Reader 2 | 1113 (37) | 389 (12) | 49 |

Table 1, above, shows read rates for tag 1 and tag 2 (ISOC and ISOB_80K respectively), when the two RFID readers were run using the free-running mode (Comparative Example) and the inhibit mode (Example). The two tags were in the RF field at the same time. The antenna multiplexer sequence on each reader was 1 then 2, repeated continuously. The tags were in the field of antenna 1.

While the present application describes a variety of particular configurations, other configurations and combinations of configurations will be apparent to an individual of ordinary skill in the art upon reading the present application, and are intended to be within the scope of the following claims.

The invention claimed is:

1. A radio frequency identification (RFID) system comprising:
a first RFID reader coupled to at least a first antenna and configured to transmit a first signal via the first antenna; and
a second RFID reader coupled to a plurality of antennas and configured to transmit a second signal via at least one of the plurality of antennas, the second RFID reader configured to:
select a second antenna of the plurality of antennas for transmitting the second signal,
determine the first RFID reader is transmitting the first signal via the first antenna, and
in response to the determination, select a next antenna of the plurality of antennas to transmit the second signal.

2. The system of claim 1, wherein the first antenna is adjacent to the second antenna.

3. The system of claim 1, wherein a transmission field of the first antenna overlaps a transmission field of the second antenna.

4. The system of claim 1, wherein the first signal interferes with the second signal based, in part, on the selected second antenna.

5. The system of claim 1, wherein second RFID reader is configured to:
determine that the first antenna is adjacent to the second antenna;
in response to determining the first and second antennas are adjacent, determine the first RFID reader is transmitting the first signal via the first antenna; and
in response to determining the first and second antennas are not adjacent, transmit the second signal via the second antenna of the plurality of antennas.

6. The system of claim 1, wherein the second RFID reader is further configured to transmit the second signal via the second antenna in response to determining that the first antenna is not transmitting the first signal.

7. The system of claim 1, wherein, to determine the first RFID reader is transmitting the first signal via the first antenna, the second RFID reader is configured to:
sample a received radio frequency (RF) signal from the first antenna; and
determine the RF signal meets predetermined criteria.

8. The system of claim 1, wherein the first RFID reader comprises a first input/output (I/O) port electrically coupled to a second I/O port of the second RFID reader, and wherein, to determine the first RFID reader is transmitting the first signal via the first antenna, the second RFID reader is configured to read a signal on the first I/O port of the first RFID reader.

9. The system of claim 8, wherein the second RFID reader is configured determine the first RFID reader is transmitting the first signal via the first antenna based on detecting the first I/O port of the first RFID reader is set to an active state.

10. The system of claim 1, wherein the plurality of antennas comprises an antenna sequence, and wherein the second RFID reader, in response to the determination, is configured to bypass the second antenna and transmit the second signal via the next antenna based, in part, on a mux sequence of the plurality of antennas.

11. The system of claim 10, wherein the second RFID reader is configured to place the second antenna in a transmission queue, and, immediately after transmitting the second signal via the next antenna, reselect the second antenna from the transmission queue.

12. The system of claim 1, wherein the second RFID reader is configured to:
prepare to transmit the second signal via the second antenna based on the selection of the second antenna; and in response to selecting the next antenna, transmit the second signal via the next antenna.

13. A method for mitigating interference in a radio frequency identification (RFID) system, the method comprising:
   selecting, by a first RFID reader, a first antenna of a plurality of antennas for transmitting a first signal, wherein the first RFID reader is coupled to the plurality of antennas and configured to transmit the first signal via at least one of the plurality of antennas;
   determining a second RFID reader is transmitting a second signal via a second antenna; and
   in response to the determination, selecting a next antenna of the plurality of antennas to transmit the first signal.

14. The method of claim 13, wherein the second signal interferes with the first signal based, in part, on the selected first antenna.

15. The method of claim 13, further comprising:
   determining that the first antenna is adjacent to the second antenna;
   in response to determining the first and second antennas are adjacent, determining the second RFID reader is transmitting the second signal via the second antenna; and
   in response to determining the first and second antennas are not adjacent, transmitting the first signal via the first antenna of the plurality of antennas.

16. The method of claim 13, further comprising transmitting the first signal via the first antenna in response to determining that the second antenna is not transmitting the second signal.

17. The method of claim 13, wherein, determining the second RFID reader is transmitting the second signal via the second antenna comprises:
   sampling a received radio frequency (RF) signal from the second antenna; and
   determining the RF signal meets predetermined criteria.

18. The method of claim 13, wherein the first RFID reader comprises a first input/output (I/O) port electrically coupled to a second I/O port of the second RFID reader, and wherein, determining the second RFID reader is transmitting the second signal via the second antenna comprises reading a signal on the second I/O port of the second RFID reader.

19. The method of claim 18, wherein determining the second RFID reader is transmitting the second signal via the second antenna comprises detecting that the second I/O port of the second RFID reader is set to an active state.

20. The method of claim 13, wherein the plurality of antennas comprises an antenna sequence, and, in response to the determination, bypassing the first antenna and transmitting the second signal via the next antenna based, in part, on a mux sequence of the plurality of antennas.

* * * * *